Figure 1:
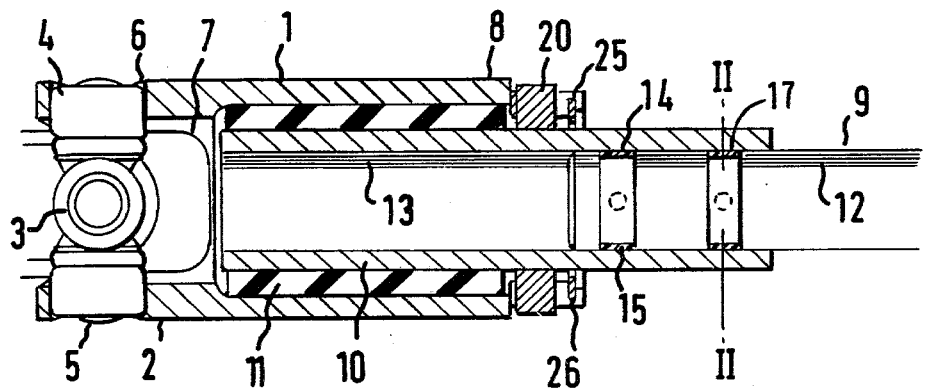

United States Patent [19]

Stephan

[11] 4,183,258
[45] Jan. 15, 1980

[54] COLLAPSIBLE SHAFT ASSEMBLY

[75] Inventor: Gerard Stephan, Croissy, France

[73] Assignee: Nadella, & French Body Corporate, Rueil-Malmaison, France

[21] Appl. No.: 858,169

[22] Filed: Dec. 7, 1977

[30] Foreign Application Priority Data

Dec. 20, 1976 [FR] France ............................... 76 38263

[51] Int. Cl.² .......................... B62D 1/18; F16D 3/76
[52] U.S. Cl. .................................. 74/492; 64/27 NM; 74/490
[58] Field of Search ............. 74/492, 490; 64/27 NM

[56] References Cited

U.S. PATENT DOCUMENTS

| 1,572,519 | 2/1926 | Davis | 74/492 |
|---|---|---|---|
| 3,046,759 | 7/1962 | Deford et al. | 74/490 X |
| 3,408,830 | 11/1968 | Sutaruk et al. | 64/27 NM |
| 3,482,653 | 12/1969 | Maki et al. | 74/492 X |
| 3,492,888 | 2/1970 | Nishimura et al. | 74/492 |
| 3,815,437 | 6/1974 | Martin | 74/492 |
| 3,851,542 | 12/1974 | Adams et al. | 74/492 |
| 3,877,319 | 4/1975 | Cooper | 74/492 |
| 3,878,695 | 4/1975 | Pitner | 64/27 NM X |

Primary Examiner—Allan D. Herrmann
Attorney, Agent, or Firm—Roy B. Moffitt

[57] ABSTRACT

A collapsible shaft assembly forming part of a universal coupling, such as in the steering system of a motor vehicle, has outer and inner sleeves, a co-axial elastomeric sleeve in radial compression there between, a shaft rotatably coupled to and axially slideable within the inner sleeve and a shearable lock to hold the shaft axially relatively to the inner sleeve up to a given, minimum axial load, such as in a motor vehicle collision.

17 Claims, 6 Drawing Figures

COLLAPSIBLE SHAFT ASSEMBLY

This invention relates to collapsible shaft assemblies and particularly, but not exclusively, relates to such assemblies for use with collapsible steering systems.

Collapsible steering systems are already known which either have parts capable of being crushed or have parts capable of relative movement under the action of impact forces. These systems generally comprise a significant number of parts and are relatively bulky.

According to the present invention, a collapsible shaft assembly comprises an outer sleeve forming part of a universal coupling, a co-axial inner sleeve in the outer sleeve, a co-axial elastomeric sleeve in radial compression between the inner and outer sleeves, a shaft rotatably coupled to and axially slideable within the inner sleeve and a shearable lock to hold the shaft axially relatively to the inner sleeve up to a given, minimum axial load.

In a preferred embodiment complementary splines cover at least part of the inside of the inner sleeve and the shaft to rotatably couple the one to the other whilst permitting relative axial movement.

The shearable lock may take a number of forms, such as:

a mass of settable material filling a groove in the shaft and material injection ports through the inner sleeve; or one or more shear pins passing through the inner sleeve and the shaft; or one or more shear studs housed in holes in the wall of the inner sleeve and co-operating with bores in the shaft; or a deformable nipple at the end of the shaft co-operating with a groove on the inside of the inner sleeve.

The inner sleeve may be provided with a radial lug or key to co-operate with clearance in an aperture in the outer sleeve. This will give rotatable coupling between the inner and outer sleeves should the elastomeric sleeve deteriorate.

In another embodiment of the invention the radial lug or key is mounted on the shaft by means of a shearable insert, the shearable lock, and again co-operates with clearance in an aperture in the outer sleeve.

Figure 2:
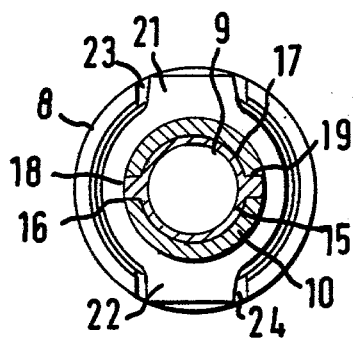
Figure 3:
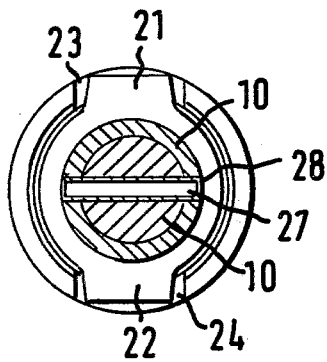
Figure 4:
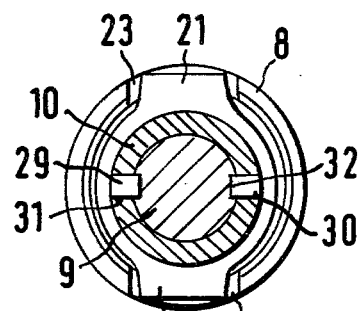
Figure 5:
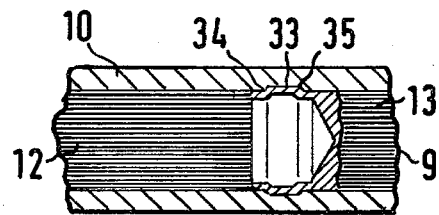
Figure 6:
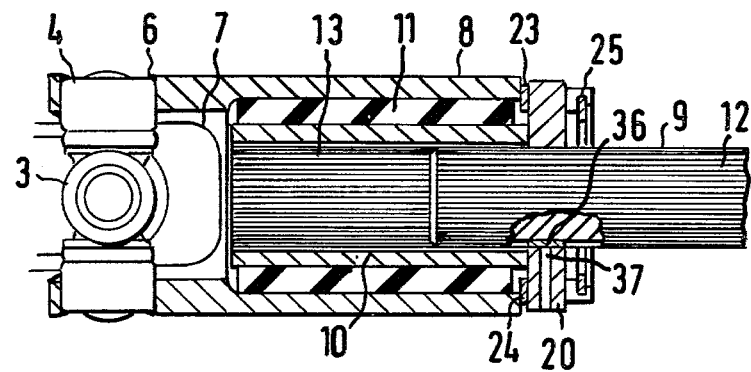

The invention is illustrated, by way of example, on the accompanying drawings, in which:

FIG. 1 is an axial section of a collapsible shaft assembly in accordance with the invention, FIG. 2 is a section on the line II—II of FIG. 1, FIGS. 3 and 4 are similar sections showing alternative shearable locks, FIG. 5 is a detail axial section showing another shearable lock, and FIG. 6 is an axial section of another embodiment of collapsible shaft assembly in accordance with the invention.

The collapsible shaft assembly shown by FIGS. 1 and 2 comprises an outer sleeve 1 at one end of which is formed the jaw 2 for a universal coupling or Hooke's joint having a cruciform spider 3 mounted with bearing cups 4 covering the trunnion ends 5, the cups being fixed in bores 6 in the diametrically opposed arms of the jaw 2. The outer sleeve 1 has a cut-away portion 7 between the arms of the jaw 2 to accommodate angular movements of the joint.

The other end portion 8 of the outer sleeve 1 forms a hub in which is mounted a rotatable shaft 9, such as a steering column. A second, inner sleeve 10 is nested coaxially within an elastomeric sleeve 11 that is also arranged coaxially within the inner sleeve 1. The cross-section of the elastomeric sleeve 11 is greater, in its free state than the section of the annulus between the outer and inner sleeves 1 and 10 so that the elastomeric sleeve is radially compressed between the outer and inner sleeves and renders them rotationally fast.

The connection between the elastomeric sleeve 11 and the inner sleeve 10 can be reinforced by bonding or vulcanising the one to the other.

The shaft 9 is mounted within the inner sleeve 10 and is rotationally coupled thereto by complementary splines 12 and 13 covering at least part of the shaft 9 and the inside of the inner sleeve 10 respectively.

In use, the shaft 9 is held axially to inner sleeve 10 by a settable mass of material 14, such as Nylon for example, that is capable of shearing under a predetermined load. The mass 14 is generally an annulus 15 formed by injecting material through ports 16 in the inner sleeve 10 into a radial groove 17 around the shaft. Injected material remaining in the ports 16 to form studs 18 integral with the annulus or locking ring 15. In the example shown in FIGS. 1 and 2, two locking rings are used.

Under the action of an axial load greater than a given minimum, for example the impact due to a collision, the studs 18 shear off the locking ring 15 at their bases 19, enabling shaft 9 to slide axially into inner sleeve 10. Thus, if such an assembly was to be fitted between a vehicle's steering wheel and box, a safety collapsible steering column would be formed.

To guard against deterioration of the elastomeric material of the sleeve 11, causing a failure in the rotational connection between the outer and inner sleeves 1 and 10, the assembly is provided with a safety washer 20 that is a tight push fit or is otherwise made fast such as by the method of United Kingdom Pat. No. 1,285,477, to the outside of inner sleeve 10 where it projects beyond the end portion 8 of the outer sleeve 1. The washer 20 has a pair of diametrically opposed, radially outwardly extending lugs 21, 22 which locate within diametrically opposed axial slots 23, 24 in the end 8 of the outer sleeve 1. The lugs 21, 22 have a clearance within the slots 23, 24 so that they do not normally contact the outer sleeve, preventing a possible path for transmission of any vibrations between the outer sleeve 1 and the inner sleeve 10.

In addition, a circlip 25 is inserted in a groove 26 within the end 8 of the sleeve 1 to axially retain the washer 20.

FIGS. 3 and 4 are similar views to FIG. 2 but show alternative forms of shearable lock to hold the shaft 9 axially in the inner sleeve 10. In FIG. 3 a, preferably hollow, shear pin 27 is force fitted into a bore 28 passing radially through the inner sleeve 10 and the shaft 9.

In FIG. 4, the shearable lock is formed by studs 29 of metal or plastics material housed in holes 30 in the wall of the inner sleeve 10. The studs 29 have end portions 31 extending into and co-operating with blind bores 32 in the shaft 9. Shearing of the studs 29 permits the shaft 9 to slide into the inner sleeve 10.

Another form of shearable lock is shown by FIG. 5 to consist of a radial groove 33 formed on the inside of the inner sleeve 10. The shaft 9 has a hollow nose portion 34 that is deformed outwardly at 35 into a nipple that locks into the radial groove 33. A given minimum axial load will cause the nipple to collapse inwardly so that it clears the groove 33 and permits the shaft to slide into the inner sleeve.

Yet another form of shearable lock is shown in FIG. 6 in which the safety washer 20 is fixed directly to the shaft 9 by, for example, holding the washer onto the splines 12 by means of a settable and shearable material 36 injected through radial ducts 37 in the washer 20 (or possibly in the shaft 9). The injected material forms an insert that can shear under axial load to permit the shaft to slide into the inner sleeve. This washer 20 also has radial lugs 21, 22 which locate with clearance within slots 23, 24 in the end 8 of the outer sleeve 1. As before, the lugs do not contact the outer sleeve in normal use.

I claim:

1. A collapsible rotatable shaft assembly comprising an outer sleeve forming part of a universal coupling, an inner sleeve coaxially received in said outer sleeve, an elastomeric sleeve coaxially disposed in a space between said inner and outer sleeves in radial compression between said inner and outer sleeves, a shaft non-rotatably coupled to and axially slideable within said inner sleeve and a shearable lock to hold said shaft axially in position relative to said inner sleeve up to a given, minimum axial load.

2. An assembly as claimed in claim 1 wherein complementary splines cover at least part of the inside of said inner sleeve and said shaft for non-rotatable coupling of the one to the other whilst permitting relative axial movement.

3. An assembly as claimed in claim 1, wherein said shearable lock is formed by a mass of settable material filling a groove in said shaft and material injection ports through said inner sleeve.

4. An assembly as claimed in claim 1 wherein said shearable lock is formed by at least one shear pin passing through said inner sleeve and said shaft.

5. An assembly as claimed in claim 1, wherein said shearable lock is formed by at least one shear stud housed in the wall of said inner sleeve and co-operating with a bore in said shaft.

6. An assembly as claimed in claim 1, wherein said shearable lock consists of a deformable nipple at the end of said shaft co-operating with a groove inside said inner sleeve.

7. An assembly as claimed in claim 3, wherein said inner sleeve has at least one radial lug to co-operate with clearance in an aperture in said outer sleeve.

8. An assembly as claimed in claim 4, wherein said inner sleeve has at least one radial lug to co-operate with clearance in an aperture in said outer sleeve.

9. An assembly as claimed in claim 5, wherein said inner sleeve has at least one radial lug to co-operate with clearance in an aperture in said outer sleeve.

10. An assembly as claimed in claim 6, wherein said inner sleeve has at least one radial lug to co-operate with clearance in an aperture in said outer sleeve.

11. An assembly as claimed in claim 2 wherein said shaft has at least one radial lug mounted thereon by means a shearable insert to co-operate with clearance in an aperture in said outer sleeve.

12. A collapsible rotatable shaft assembly comprising an outer sleeve forming a part of a universal coupling, an inner sleeve coaxially received in said outer sleeve, said inner and outer sleeves being radially spaced apart to define a space therebetween, an elastomeric sleeve received in said space in coaxial relation with said inner and outer sleeves, said elastomeric sleeve being radially compressed between said inner and outer sleeves to couple said inner and outer sleeves together for unitary rotation, a shaft non-rotatably coupled to and axially slideable within said inner sleeve, and shearable lock means holding said shaft axially in position relative to said inner sleeve up to a given, minimum axial load, said lock means being subject to structural failure by axial loads in excess of said minimum axial load to release said shaft for axial movement relative to said inner sleeve for telescopically collapsing the sub-assembly of said shaft and said inner sleeve.

13. The collapsible rotatable shaft assembly defined in claim 12 wherein said shearable lock means engages said shaft and a part in the sub-assembly of said inner and outer sleeves.

14. The collapsible rotatable shaft assembly defined in claim 13 wherein said part is said inner sleeve.

15. The collapsible rotatable shaft assembly defined in claim 14 wherein said lock means is in the form of a mass of settable material filling a groove formed on said shaft and material injection ports formed through said inner sleeve.

16. The collapsible rotatable shaft assembly defined in claim 13 wherein said shaft and said inner sleeve are non-rotatably coupled together by coacting means on said shaft and said inner sleeve, said coacting means acting independently of said lock means to maintain said shaft and said inner sleeve non-rotatably coupled together even though said lock means structurally fails.

17. The collapsible rotatable shaft assembly defined in claim 1 wherein said shaft and said inner sleeve are non-rotatably coupled together by coacting means on said shaft and said inner sleeve, said coacting means acting independently of said lock means to maintain said shaft and said inner sleeve non-rotatably coupled together even though said lock means structurally fails.

* * * * *